(12) United States Patent
Price et al.

(10) Patent No.: US 11,580,450 B2
(45) Date of Patent: Feb. 14, 2023

(54) SYSTEM AND METHOD FOR EFFICIENTLY MANAGING LARGE DATASETS FOR TRAINING AN AI MODEL

(71) Applicant: Palo Alto Research Center Incorporated, Palo Alto, CA (US)

(72) Inventors: Robert R. Price, Palo Alto, CA (US); Matthew A. Shreve, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 501 days.

(21) Appl. No.: 16/744,890

(22) Filed: Jan. 16, 2020

(65) Prior Publication Data

US 2021/0224683 A1 Jul. 22, 2021

(51) Int. Cl.
*G06N 20/00* (2019.01)
*G06K 9/62* (2022.01)

(52) U.S. Cl.
CPC .......... *G06N 20/00* (2019.01); *G06K 9/6218* (2013.01); *G06K 9/6256* (2013.01)

(58) Field of Classification Search
None
See application file for complete search history.

(56) References Cited

U.S. PATENT DOCUMENTS

| 11,119,630 | B1 * | 9/2021 | Marchetti | G06N 5/04 |
| 2020/0349468 | A1 * | 11/2020 | Arya | G06F 16/953 |
| 2021/0019615 | A1 * | 1/2021 | Sakakini | G06N 3/0445 |
| 2021/0174200 | A1 * | 6/2021 | Huang | G06N 3/0454 |
| 2021/0201190 | A1 * | 7/2021 | Edgar | G06N 20/00 |
| 2021/0216831 | A1 * | 7/2021 | Ben-Itzhak | G06K 9/6259 |

* cited by examiner

*Primary Examiner* — Vikkram Bali
(74) *Attorney, Agent, or Firm* — Shun Yao; Yao Legal Services, Inc.

(57) ABSTRACT

Embodiments described herein provide a system for facilitating efficient dataset management. During operation, the system obtains a first dataset comprising a plurality of elements. The system then determines a set of categories for a respective element of the plurality of elements by applying a plurality of AI models to the first dataset. A respective category can correspond to an AI model. Subsequently, the system selects a set of sample elements associated with a respective category of a respective AI model and determines a second dataset based on the selected sample elements.

20 Claims, 10 Drawing Sheets

SYSTEM AND METHOD FOR EFFICIENTLY MANAGING LARGE DATASETS FOR TRAINING AN AI MODEL

BACKGROUND

Field

This disclosure is generally related to the field of artificial intelligence (AI). More specifically, this disclosure is related to a system and method for managing a large dataset for efficiently training an AI model.

Related Art

With the advance of imaging technologies, computing and storage resources are awash in raw data. For example, sensors and satellites generate several terabytes of data every day. Similarly, the Internet can provide access to large amounts of data to train models. However, such data is typically unlabeled and unstructured. For instance, raw satellite images are usually not labeled describing the image. Even though machine learning can be used to automatically organize the data and identify important pieces of information, typical unsupervised machine learning algorithms may not be suitable for large volumes of data.

In particular, if an AI model is used for exploratory data analysis, where an analyst works interactively with data to find patterns, a large volume of unlabeled data may limit the operations of the AI model. The interactive scenario can facilitate active learning where the model can identify a small number of substructures in the data that may group/cluster many instances of the same phenomenon. The model can then provide the identified structures to a user and allow the user to facilitate semantically descriptive labels for these structures.

To reduce the size of the dataset, random sampling of datasets can be performed for fitting AI models. However, random sampling can lead to a dataset that over- or under-samples some subgroups. Such a dataset can lead to biased conclusions. Typically, random sampling may require a large fraction of the original sample to mitigate the impact of bias. In particular, for unbalanced datasets, random sampling can be challenging. For instance, in rural aerial surveillance images, the scene can be empty most of the time. However, for a small fraction of the time, such images can include important pieces of information. However, a small image sample generated from random sampling of the data may entirely exclude the important pieces of information.

While AI models bring many desirable features to data management, some issues remain unsolved in identifying/classifying a large unlabeled dataset.

SUMMARY

Embodiments described herein provide a system for facilitating efficient dataset management. During operation, the system obtains a first dataset comprising a plurality of elements. The system then determines a set of categories for a respective element of the plurality of elements by applying a plurality of AI models to the first dataset. A respective category can correspond to an AI model. Subsequently, the system selects a set of sample elements associated with a respective category of a respective AI model and determines a second dataset based on the selected sample elements.

In a variation on this embodiment, the plurality of AI models includes one or more pre-trained classifiers.

In a variation on this embodiment, applying an AI model of the plurality of AI models to the first dataset can include categorizing the plurality of elements into a set of categories supported by the AI model.

In a variation on this embodiment, applying an AI model of the plurality of AI models to the first dataset can include obtaining embeddings for the plurality of elements based on the AI model and grouping the plurality of elements into a set of clusters based on the embeddings.

In a further variation, grouping the plurality of elements can include applying a k-means clustering algorithm to the embeddings.

In a variation on this embodiment, the system determines a number of sample elements to be selected for a respective category of a respective AI model.

In a further variation, the system determines the number of sample elements based on a joint category corresponding to categories of multiple AI models.

In a variation on this embodiment, the system determines the number of sample elements for a category of an AI model without considering a category of another AI model.

In a variation on this embodiment, the number of sample elements selected for the category corresponds to a proportion of elements for the category in the first dataset.

In a variation on this embodiment, the system trains a new AI model using the second dataset based on proportions of elements in the first dataset in a respective category of a respective AI model.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

Embodiments described herein solve the problem of managing a large input dataset (or an input set) for efficiently training an AI model by providing a system that facilitates stratified sampling. The system can reuse one or more trained AI models (e.g., neural-network-based classifiers that have been trained) and cost-sensitive learning to generate a sample set from the input set. Such a sample set can be significantly smaller than the input set but retain the important features of the input set without introducing biases.

With existing technologies, dataset management techniques rely on generating a reduced set by selecting elements that may represent all elements of the input set. Typically, such selection is performed to ensure that the performance of a target operation on the reduced set is within a threshold of the performance of the operation on the input set. In other words, such techniques try to find a set of sample elements, each with a set of features, such that the features of every other element in the input set are within a threshold of the set of features. However, these techniques may determine the distances between features with respect to the features of all elements of the input set. Such an approach can miss high-level semantic considerations.

For example, if the input set is a set of images, the input set may include images of different vehicles. In the input set, an image of an orange car and an image of an orange truck may include a large number of orange pixels. However, a car can be significantly different than a truck (e.g., a car and a truck belong to semantically different categories of vehicles). On the other hand, images of a blue car and a red car may not have significant overlap in pixels even though the images depict vehicles of the same semantic category. As a result, without semantic analysis, a sample set generated by these techniques may not include sample elements from a respective semantic category.

To solve these problems, a dataset management system can efficiently generate a sample set that can be significantly smaller than the input set based on stratified sampling. During operation, the system categorizes the data elements (or elements) in the input set by applying a set of trained AI models on the input set. The system then selects a number of elements from a respective category or class associated with a respective AI model to generate a new dataset to generate the sample set. Since the sample set includes a set of elements (e.g., at least one element) from each category of each AI model, the sample set can represent the semantic categories, as determined by the AI models, of the input set. As a result, a new AI model can be efficiently trained using the sample set to learn and subsequently identify information of interest from the input set.

The system can use joint categories to select an element from the input set. To do so, if one AI model classifies based on one type and another AI model classifies based on another type, the system can select elements such that an element that belongs to both types appears in the sample set. For example, if the input set includes images and the two types are color and model of a vehicle, images of each model of each color are represented in the sample set. The system can select the samples based on uniform frequency to ensure that the number of elements in each category of an AI model is uniform across the joint categories.

Since the system performs the categorization on the input set, the system is aware of the number of elements of the input set that belongs to a joint category (i.e., the cardinality of each joint category). The system can use the proportion of the elements in the joint category with respect to all other categories to determine the number of elements of a particular joint category that should be selected for the sample set. This allows the system to select the elements based on the original frequencies of a particular joint category in the input set. However, selecting elements based on the joint categories can become complex. For example, if the system uses ten AI models, each of which classifies the input set into ten categories, the joint categories can include $10^{10}$ or ten billion categories. Therefore, if the system uniformly samples based on the joint categories, the system can generate ten billion samples, which may not be feasible.

To address this issue, the system can independently sample from the categories of each AI model. For example, if two AI models classify elements based on color and model, respectively, the system may select elements based on color independently without considering the models. Consequently, the system can include elements from each of the categories of each AI model, thereby avoiding the joint categories. This selection technique can be referred to as independent covering. In this way, the system can classify the elements of the input set into discrete semantic categories associated with one or more AI models.

In some embodiments, the system may obtain embeddings of the AI models during the categorization/classification process. For example, if an AI model is a deep neural network, the AI model can be trained to classify based on a type (e.g., a domain) and subsequently used to generate embeddings. The inner layers of the network project elements of the input set into semantic spaces that allow subsequent layers to make distinctions associated with the type. However, an embedding is typically a vector of feature values and does not provide the final categorization (i.e., does not provide a cluster structure). To sample based on the embeddings, the system can use a clustering technique (e.g., k-means clustering) to generate clusters based on the embeddings. The system can generate these clusters based on joint embeddings or use a separate set of clusters for each AI model. The system can then select elements from the clusters based on joint clusters or independent clusters.

Exemplary System

Figure 1:
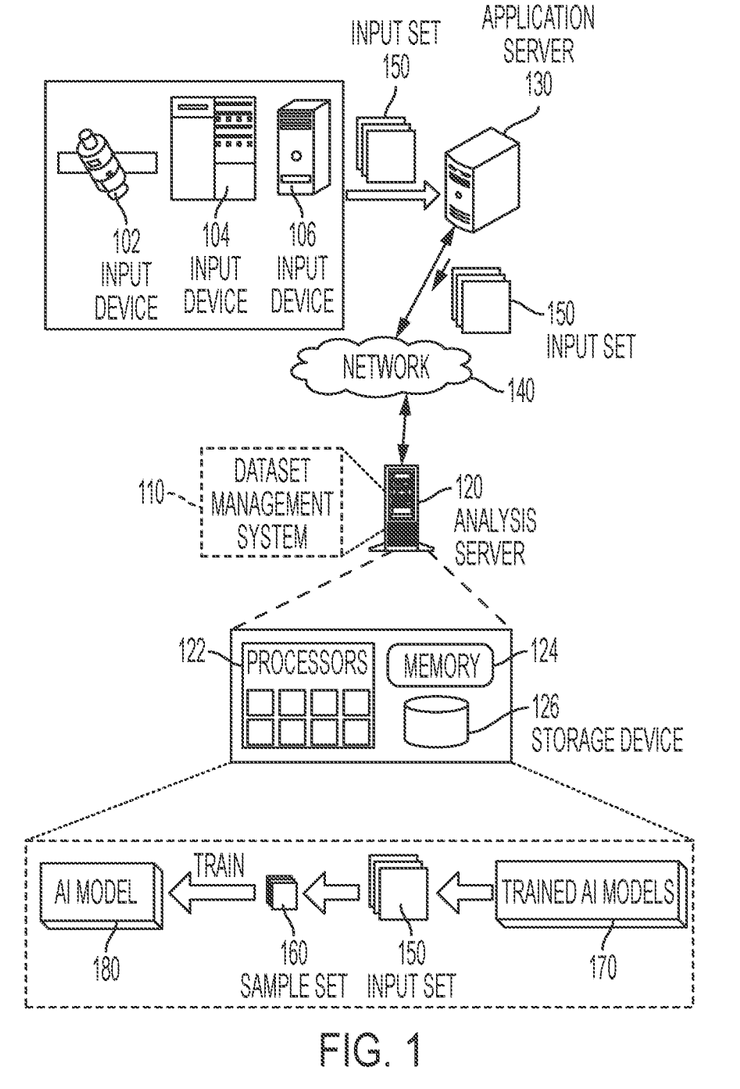
FIG. 1 illustrates an exemplary dataset management system for efficiently managing a large input dataset for training an AI model, in accordance with an embodiment of the present application.

FIG. 1 illustrates an exemplary dataset management system for efficiently managing a large input dataset for training an AI model, in accordance with an embodiment of the present application. In this example, a large input dataset (or input set) 150 can be generated by one or more input devices 102, 104, and 106. For example, input device 102 can be a satellite system, input device 104 can be a high-performance and/or distributed computing system, and input device 106 can be a cloud computing resource (e.g., a server for a social media platform). Each of these input devices may generate a large volume of data. Upon generating input data 150, these input devices may provide input data 150 to an application server 130 via one or more communication channels. Application server 130 can facilitate configurations and/or operations of the input devices and may receive data streams from them.

With existing technologies, dataset management techniques rely on generating a reduced set from input set 150 by selecting elements that may represent all elements of input set 150. Typically, such a selection is performed to ensure that the performance of a target operation on the reduced set is within a threshold of the performance of the operation on input set 150. In other words, such techniques try to find a set of sample elements, each with a set of features, such that the features of every other element in input set 150 are within a threshold of the set of features. However, these techniques may determine the distances between features with respect to the features of all elements of input set 150. Such an approach can miss high-level semantic considerations for the elements of input set 150.

For example, if input set 150 is a set of images, input set 150 may include images of different vehicles. In input set 150, an image of an orange car and an image of an orange truck may include a large number of orange pixels. However, a car can be significantly different than a truck (e.g., a car and a truck belong to semantically different categories of vehicles). On the other hand, images of a blue car and a red car may not have significant overlap in pixels even though the images depict vehicles of the same semantic category. As a result, without semantic analysis, a sample set generated by these techniques may not include sample elements from a respective semantic category of input set 150.

To solve these problems, a dataset management system 110 can facilitate efficient management of large datasets based on semantic information and stratified sampling. System 110 can operate on an analysis server 120, which can include a set of processors 122 (e.g., a multi-core processor), a memory device 124, and a storage device 126. During operation, analysis server 120 can obtain input set 150 from application server 130 via a network 140. Examples of network 140 can include, but are not limited to, a local area network (LAN), a datacenter network, a wide area network (WAN), and the Internet.

Upon obtaining input set 150, system 110 categorizes the elements in input set 150 by applying a set of trained AI models 170 on input set 150. Each of trained AI models 170 can be neural networks trained to classify the elements (e.g., determine categories of the elements) based on one or more pieces of semantic information. For example, one AI model can classify the elements based on color and another AI model can classify the elements based on size. In this way, system 110 can categorize the elements of input set 150 based on semantic information associated with the elements. Here, system 110 classifies the elements of input set 150 into discrete categories, thereby mapping the elements to a discrete semantic space.

System 110 then selects a number of elements from a respective category associated with a respective AI model to generate a new dataset to generate a sample set 160. Since sample set 160 includes a set of elements (e.g., at least one element) from each category of each AI model, sample set 160 can represent the semantic categories, as determined by AI models 170, of input set 150. As a result, a new AI model 180 can be efficiently trained using sample set 160 to learn and subsequently classify information of interest from input set 150. However, since AI models 170 classify the elements into discrete categories, the categorization of input set 150 can be dependent on the categories or classes supported by AI models 170.

AI models 170 may determine a set of features for a respective element of input set 150 and represent the corresponding values of the features in a feature vector. Such a feature vector can be referred to as an embedding. The embeddings generated at a layer of an AI model can be used by a subsequent layer of the AI model to determine a corresponding output. System 110 may obtain embeddings of AI models 170 during the categorization or classification process for input set 150. For example, if an AI model is a deep neural network, the AI model can be trained to classify based on a type (e.g., a domain) and subsequently used to generate embeddings. The inner layers of the network project the elements into semantic spaces that allow subsequent layers to make distinctions associated with the type.

Because an embedding is typically a vector of feature values, the embedding may not provide the final categorization (i.e., does not provide a cluster structure). To sample based on the embeddings, system 110 can use a clustering technique to generate clusters based on the embeddings. Examples of a clustering technique include, but are not limited to, hierarchical clustering, k-means clustering, and graph-based clustering. System 110 can generate these clusters based on joint embeddings or use a separate set of clusters for each AI model. System 110 can then select elements from the clusters based on joint clusters or independent clusters. Based on the selection, system 110 can generate sample set 160, which can be used for training AI model 180.

Element Selection from Categories

Figure 2A:
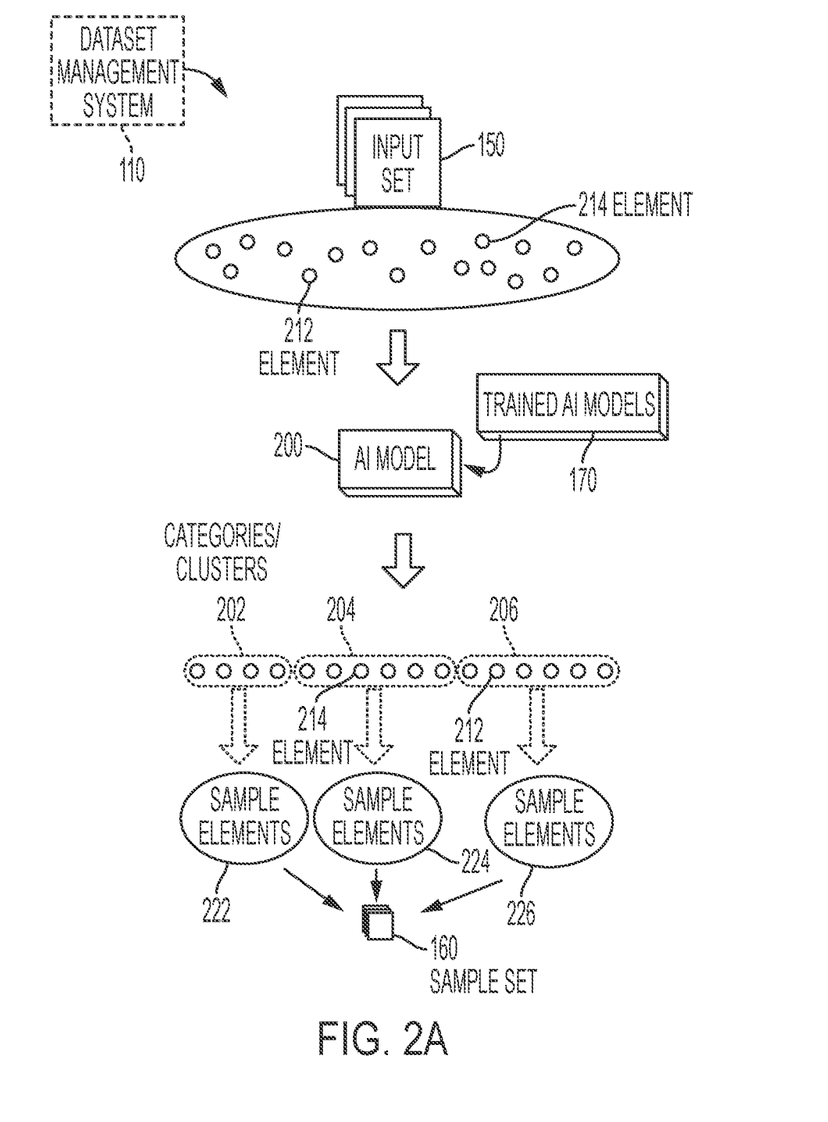
FIG. 2A illustrates an exemplary efficient sample selection based on a classifier, in accordance with an embodiment of the present application.

FIG. 2A illustrates an exemplary efficient sample selection based on a classifier, in accordance with an embodiment of the present application. Since system 110 can categorize the elements in input set 150 by applying AI models 170 on input set 150, each of AI models 170 can be applied to input set 150 to categorize the elements based on the feature in which the AI model has been trained. For example, an AI model 200 in AI models 170 can be applied to input set 150 to categorize the elements based on the feature in which AI model 200 has been trained. AI model 200 can classify the elements of input set 150 into a number of categories 202, 204, and 206 based on the feature. Suppose that input set 150 includes elements 212 and 214. AI model 200 can categorize elements 212 and 214 into categories 206 and 204, respectively.

If AI model 200 is trained to categorize based on object type and input set 150 includes a set of images, AI model 200 can determine the object types represented in the images of input set 150. As a result, categories 202, 204, and 206 can represent different types of objects depicted in the elements of input set 150. If elements 212 and 214 are images, AI model 200 can categorize the types of objects depicted in elements 212 and 214. Consequently, elements 212 and 214 are placed in different categories associated with different object types. System 110 then selects a number of sample elements 222, 224, and 226 from the elements in categories 202, 204, and 206, respectively. Sample elements 222, 224, and 226 can be included in sample set 160. Since sample set 160 includes sample elements 222, 224, and 226, which represent the semantic categories associated with object types, sample set 160 can include semantically meaningful elements.

As described in conjunction with FIG. 1, AI model 200 can determine the embeddings of the elements of input set 150. However, the embedding may not provide the final categorization for the elements in input set 150. To sample based on the embeddings, system 110 can apply one or more clustering techniques on the embeddings to generate clusters 202, 204, and 206. In other words, if the categorization is not directly obtained from AI model 200, system 110 can use one or more clustering techniques to determine the semantically meaningful clusters. Accordingly, elements 212 and 214 can be placed in clusters 206 and 204, respectively. System 110 can then select sample elements 222, 224, and 226 from the elements in categories 202, 204, and 206, respectively.

Figure 2B:
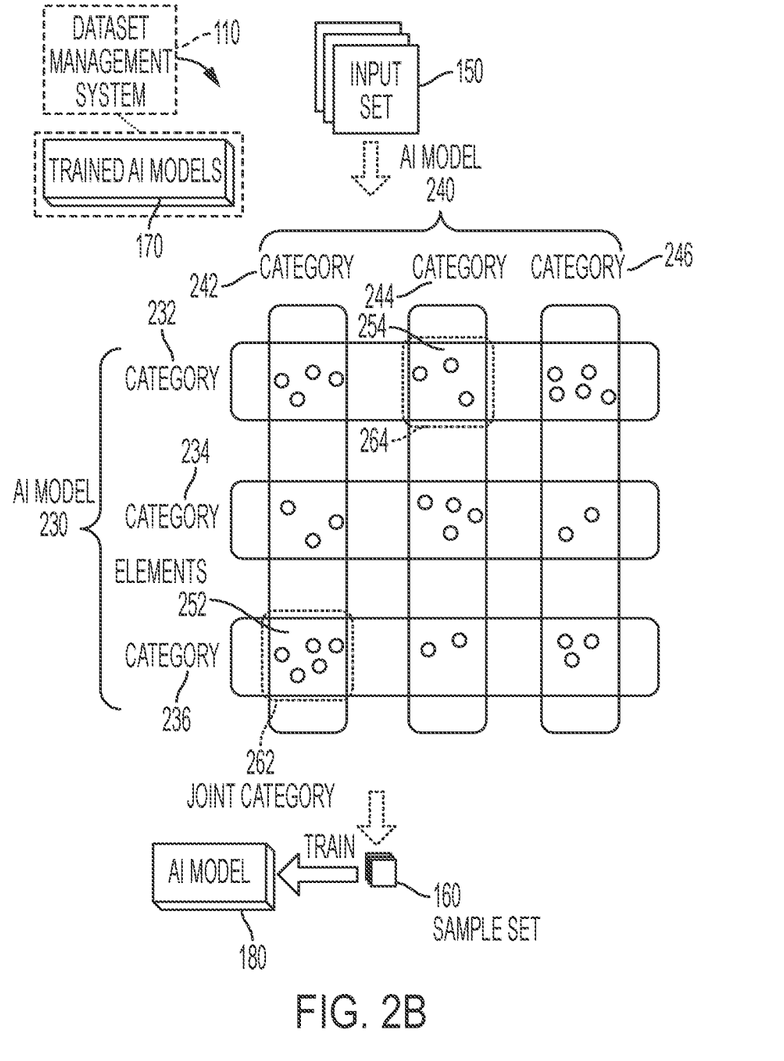
FIG. 2B illustrates an exemplary efficient sample selection based on a set of classifiers, in accordance with an embodiment of the present application.

FIG. 2B illustrates an exemplary efficient sample selection based on a set of classifiers, in accordance with an embodiment of the present application. System 110 can use joint categories to select an element from input set 150. AI models 170 can include an AI model 230 that classifies the elements of input set 150 into categories 232, 234, and 236 based on one type. AI models 170 can also include an AI model 240 that classifies the elements of input set 150 into categories 242, 244, and 246 based on another type. System 110 can then select elements such that an element that belongs to both types appears in sample set 160. For example, if input images 150 includes images and the two types are color and model of a vehicle, system 110 can select the elements from input set 150 in such a way that images of each vehicle model of each color are represented in the sample set.

In this example, elements 252 can belong to a joint category 262 of categories 236 and 242 associated with AI models 230 and 240, respectively. Similarly, elements 254 can belong to a joint category 264 of both categories 232 and 244 associated with AI models 230 and 240, respectively. System 110 can select the samples from elements 252 and 254 based on uniform frequency to ensure that the number of elements in each category is uniform across the joint categories. Since system 110 performs the categorization on input set 150, system 110 is aware of the number of elements of the input set that belongs to a joint category (i.e., the cardinality of each joint category). System 110 can use the proportion of the elements in joint category 264 of categories 232 and 244 with respect to all other joint categories to determine the number of elements from elements 254 that should be selected for sample set 160.

Selecting elements for sample set 160 based on the proportions of the joint categories in input set 150 allows system 110 to select the elements based on the original frequencies of a particular joint category in input set 150. However, selecting elements based on joint categories can become complex. For example, if AI models 170 include ten AI models, each of which classifies the input set into ten categories, the joint categories can include $10^{10}$ or ten billion categories. Therefore, if system 110 uniformly samples based on the joint categories, system 110 can generate ten billion samples, which may not be feasible.

During operation, system 110 can determine the joint category probability for each of AI models 170 for each element i in input set 150. Suppose that input set 150 is a dataset X consisting of N elements and AI models 170 include J number of models (e.g., J number of classifiers). System 110 can apply J number AI models (i.e., the number of models in AI models 170 can be J) on each element i to get a vector of categories (e.g., class labels) $[c_1^i, c_2^i, \ldots, c_J^i]$. AI models 170 induce a joint distribution $Pr(C_1, C_2, \ldots, C_J|X)$ over categories (or class labels) for each AI model. It should be noted that the probabilities of the categories determined by each AI model are independent given the unlabeled element $x_i$ in X such that $Pr(C_1^i, C_2^i, \ldots, C_J^i|X_i) = \Pi_j Pr(C_j^i|X_i)$. This allows system 110 to determine each $$Pr(C_j^i = k \mid X_i) \text{ as } \frac{\sum_{i=1}^{k} f(X_i)}{N}$$

if the cardinality of categories $|C_i|$ for a particular AI model is considered instead of the joint distribution, which has a parameter size $|C| = \Pi_i |C_i|$.

System 110 can then form sample set 160, which can be a dataset Z of size M<<N, by accepting or rejecting each element $x_i$ in X so that the selection balances the joint category assignment probabilities $Pr(C_1, C_2, \ldots, C_J|Z)$. Suppose that $Pr(A_i)$ is the probability of accepting element i for sample set 160. If the number of joint categories is k, system 110 can select the number of elements in each of k categories for sample set 160 in equal frequencies. Consequently, the number of elements in sample set 160 from each of k joint categories can be M/k. In other words, system 110 can determine the number of elements for category $C_i$ as $NPr(C_i)$ times the acceptance probability $Pr(A_i)$ to ensure the uniform frequency M/k. Therefore, $NPr(C_i)Pr(A_i)=M/k$. By isolating the acceptance probability, system 110 can determine that $$Pr(A_i) = \frac{M}{kNPr(C_i)}.$$

Sample set 160 can be used for training AI model 180. It should be noted that AI model 180 can be unsupervised, supervised, or semi-supervised with active learning. However, sample set 160 may depart statistically from input 150. To solve this issue, system 110 may use the proportion of a respective joint category C in input set, $Pr(C|X)$, to facilitate cost-sensitive learning. To do so, system 110 can use the class proportion $Pr(C|X)$ as a weight on the gradient update rule for AI model 180. Consequently, AI model 180 incorporates the original frequencies in input set 150.

To reduce the number of samples in sample set 160, system 110 can independently sample from the categories of each of AI models 230 and 240. For example, system 110 may select elements from categories 232, 234, and 236 without considering which category the selected elements may belong to in categories 242, 244, and 246. Similarly, system 110 may select elements from categories 242, 244, and 246 without considering which category the selected elements may belong to in categories 232, 234, and 236. Consequently, the system can include elements from each of categories 232, 234, and 236 of AI model 230 and avoid joint categories 262 and 264.

This selection technique can be referred to as independent covering. This independent covering technique can reduce the number of samples in sample set 160. System 110 can independently select a set of elements comprising M/J number of elements for each of J number of AI models. Within the M/J elements, system 110 can uniformly select elements from the categories supported by the AI model. System 110 can then combine J number of sets, each with M/J elements, to obtain sample set 160 with M elements.

Categorization Techniques

Figure 3A:
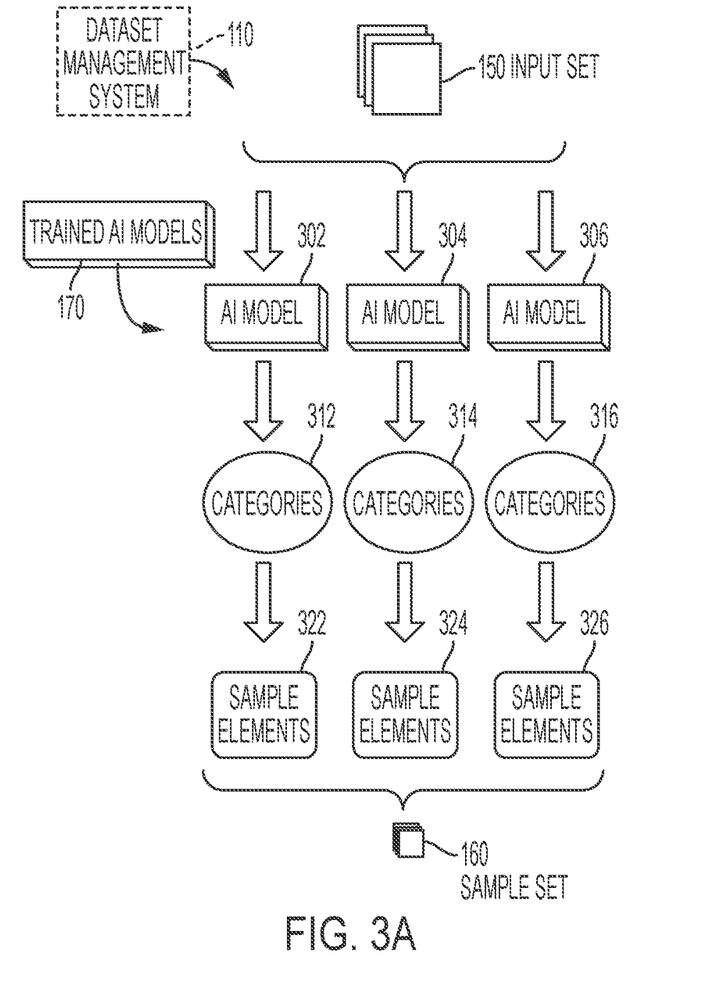
FIG. 3A illustrates an exemplary sampling of elements in discrete semantic space, in accordance with an embodiment of the present application.

FIG. 3A illustrates an exemplary sampling of elements in discrete semantic space, in accordance with an embodiment of the present application. Upon obtaining input set 150, system 110 can categorize the elements of input set 150 by applying a set of trained AI models 170 on input set 150. AI models 170 can include a number of AI models, such as AI models 302, 304, and 306, trained to classify the elements based on one or more pieces of semantic information. AI models 302, 304, and 306 can independently classify the elements into different categories 312, 314, and 316, respectively. Each element in input set 150 can correspond to a category in categories 312, a different category in categories 314, and another category in categories 316. In this way, system 110 can categorize the elements of input set 150 based on different pieces of semantic information associated with the elements.

System 110 then selects a number of elements from a respective category associated with a respective AI model to generate sample set 160. If AI model 302 is trained to categorize based on a type of feature, for each element in input set 150, AI model 302 can determine a category that corresponds to that feature of the element. AI model 302, thus, generates a set of categories 312 for the elements in input set 150. Each category of categories 312 may be associated with one or more elements of input set 150. It should be noted that an element in input set 150 can be categorized into multiple categories in categories 312. Similarly, AI models 304 and 306 generate sets of categories 314 and 316, respectively.

System 110 can determine a number of sample elements to be allocated for AI model 302 and determine the sample elements for each category of categories 312. In some embodiments, system 110 uniformly selects the number of sample elements for AI model 302 and the number sample elements for each category of categories 312. By combining the sample elements of each category, system 110 determines sample elements 322 from the elements in categories 312. Similarly, system 110 determines sample elements 324 and 326 from the elements in categories 314 and 316, respectively. System 110 can then combine sample elements 322, 324, and 326 to generate sample set 160.

Consequently, sample set 160 includes a set of elements (e.g., at least one element) from a respective category of categories 312, a respective category of categories 314, and a respective category of categories 316. As a result, sample set 160 can represent the semantic categories, as determined by AI models 302, 304, and 306, of input set 150. However, since AI models 170 classify the elements into discrete categories, the categorization of input set 150 can be dependent on the categories or classes supported by AI models 302, 304, and 306.

Figure 3B:
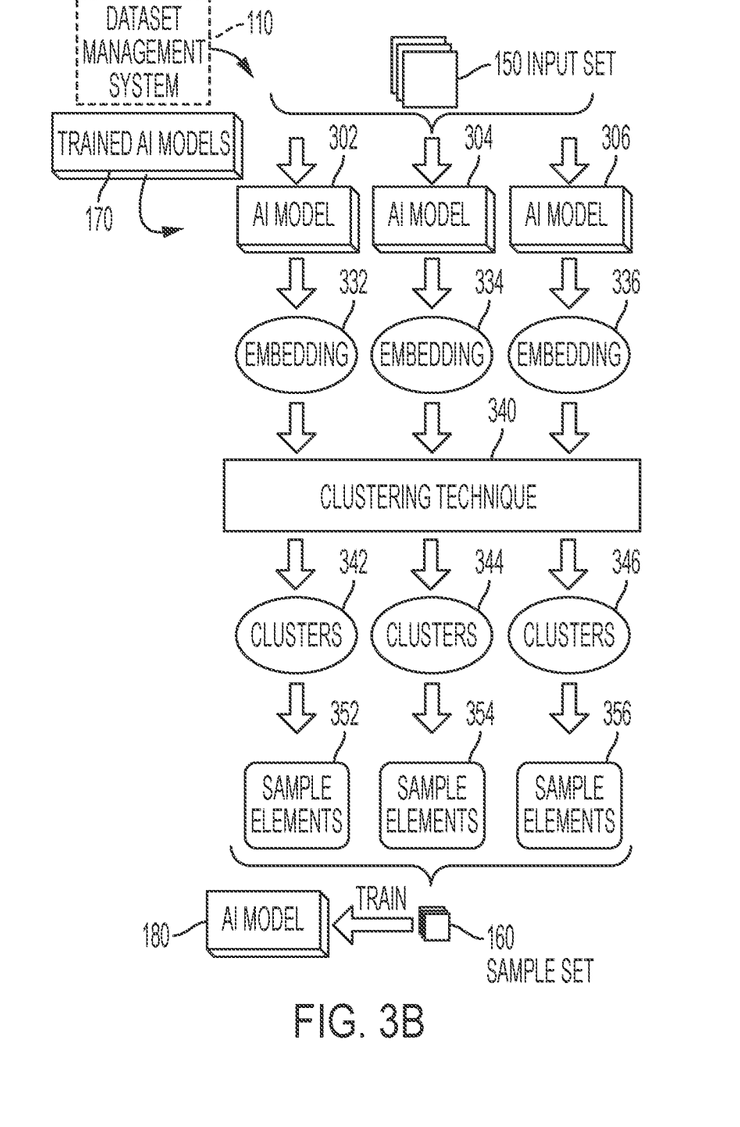
FIG. 3B illustrates an exemplary sampling of elements using semantic embeddings, in accordance with an embodiment of the present application.

AI models 302, 304, and 306 can also determine the embeddings of the elements of input set 150. FIG. 3B illustrates an exemplary sampling of elements using semantic embeddings, in accordance with an embodiment of the present application. Each of AI models 302, 304, and 306 may determine the embeddings for a respective element of input set 150. Thus, AI models 302, 304, and 306 can generate embeddings 332, 334, and 336, respectively, for the elements of input set 150. System 110 may obtain embeddings 332, 334, and 336 from the categorization or classification process of AI models 302, 304, and 306, respectively, for elements 150. Each of AI models 302, 304, and 306 can project a respective element of input set 150 into a semantic space that represents a set of semantic features.

Because a respective embedding of embeddings 332, 334, and 336 is typically a vector of feature values, that embedding may not provide categorization of the corresponding element. To sample based on the embeddings, system 110 can use a clustering technique 340 to generate clusters 342, 344, and 346 based on embeddings 332, 334, and 336, respectively. For example, embedding 332 can include an embedding for a respective element of input set 150. An embedding can include a feature vector indicating a set of feature values associated with a corresponding set of features of the element. System 110 can then apply clustering technique 340 to a respective embedding of embeddings 332.

Clustering technique 340 can allocate the embedding a cluster based on the feature values of the embedding. If clustering technique 340 includes a k-means clustering technique, embeddings 332 can produce k clusters and a respective embedding of embeddings 332 can be allocated to one of the k clusters. System 110 can generate these clusters based on joint embeddings or use a separate set of clusters for each of AI models 170. System 110 can then select elements from the clusters based on joint clusters or independent clusters. In other words, a set of independent clusters can be generated from the embeddings of an individual AI model. A set of joint clusters can be generated from the embeddings of all AI models.

System 110 can then select elements for sample set 160 based on the selection policy described in conjunction with FIG. 3A (i.e., instead of selecting from categories, system 110 can select from clusters). For example, system 110 can determine a number of sample elements to be allocated for AI model 302 and determine the sample elements for each cluster of clusters 342. By combining the sample elements of each cluster, system 110 determines sample elements 352 from the elements in clusters 342. Similarly, system 110 determines sample elements 354 and 356 from the elements in clusters 344 and 346, respectively. System 110 can then combine sample elements 352, 354, and 356 to generate sample set 160. It should be noted that, during subsequent training of AI model 180, updates on the sampled elements can be weighted by the relative size of the cluster |k|/M.

Operations

Figure 4A:
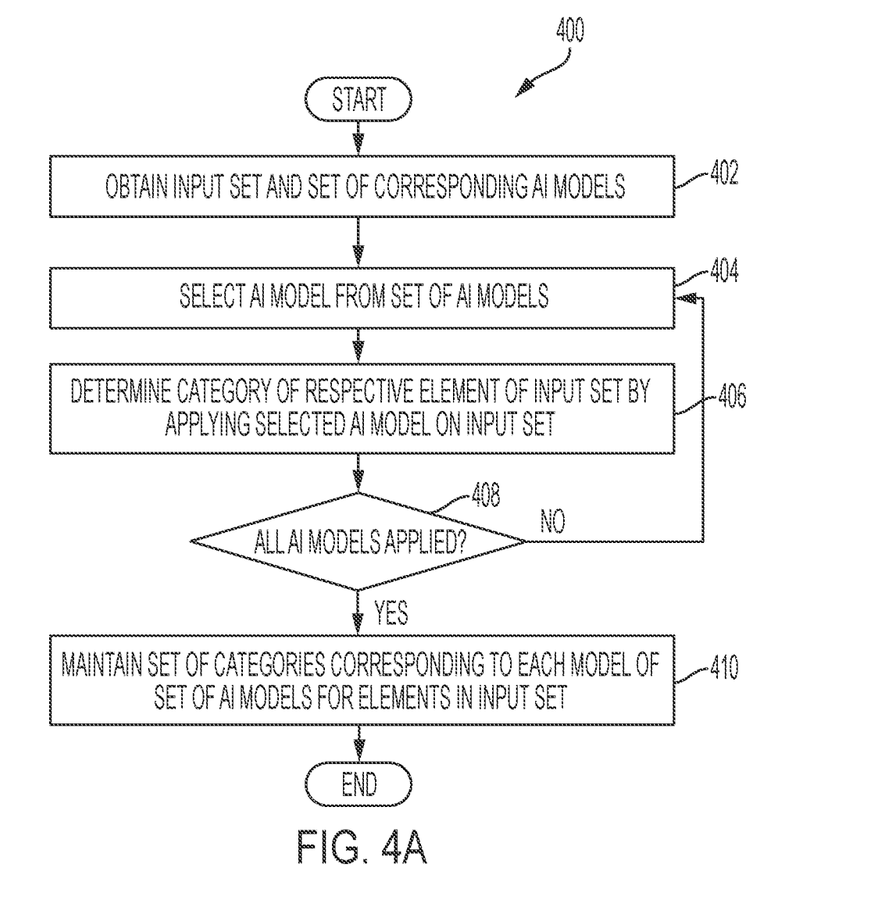
FIG. 4A presents a flowchart illustrating a method of a dataset management system sampling images in discrete semantic space, in accordance with an embodiment of the present application.

FIG. 4A presents a flowchart 400 illustrating a method of a dataset management system sampling images in discrete semantic space, in accordance with an embodiment of the present application. During operation, the system can obtain an input set and a set of corresponding AI models (operation 402). The system selects an AI model from the set of AI models (operation 404) and determines the category of a respective element of the input set by applying the selected AI model on the input set (operation 406). The system then checks whether all AI models have been applied (operation 408). If all AI models have not been applied, the system continues to select the next AI model from the set of AI models (operation 404). On the other hand, if all AI models have been applied, the system can maintain a set of categories corresponding to each model of the set of AI models for the elements in the input set (operation 410).

Figure 4B:
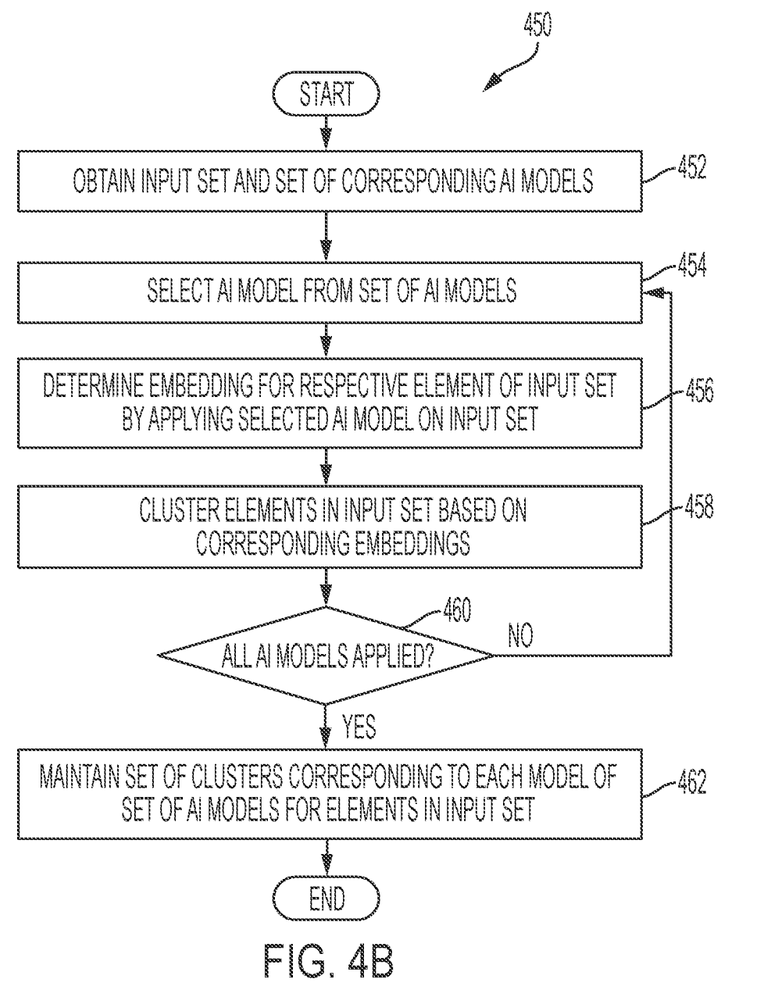
FIG. 4B presents a flowchart illustrating a method of a dataset management system sampling images using semantic embeddings, in accordance with an embodiment of the present application.

FIG. 4B presents a flowchart 450 illustrating a method of a dataset management system sampling images using semantic embeddings, in accordance with an embodiment of the present application. During operation, the system can obtain an input set and a set of corresponding AI models (operation 452). The system selects an AI model from the set of AI models (operation 454) and determines the embedding of a respective element of the input set by applying the selected AI model on the input set (operation 456). The system can then cluster the elements in the input set based on the corresponding embeddings (operation 458). The system then checks whether all AI models have been applied (operation 460). If all AI models have not been applied, the system continues to select the next AI model from the set of AI models (operation 454). On the other hand, if all AI models have been applied, the system can maintain a set of clusters corresponding to each model of the set of AI models for the elements in the input set (operation 462).

Figure 5:
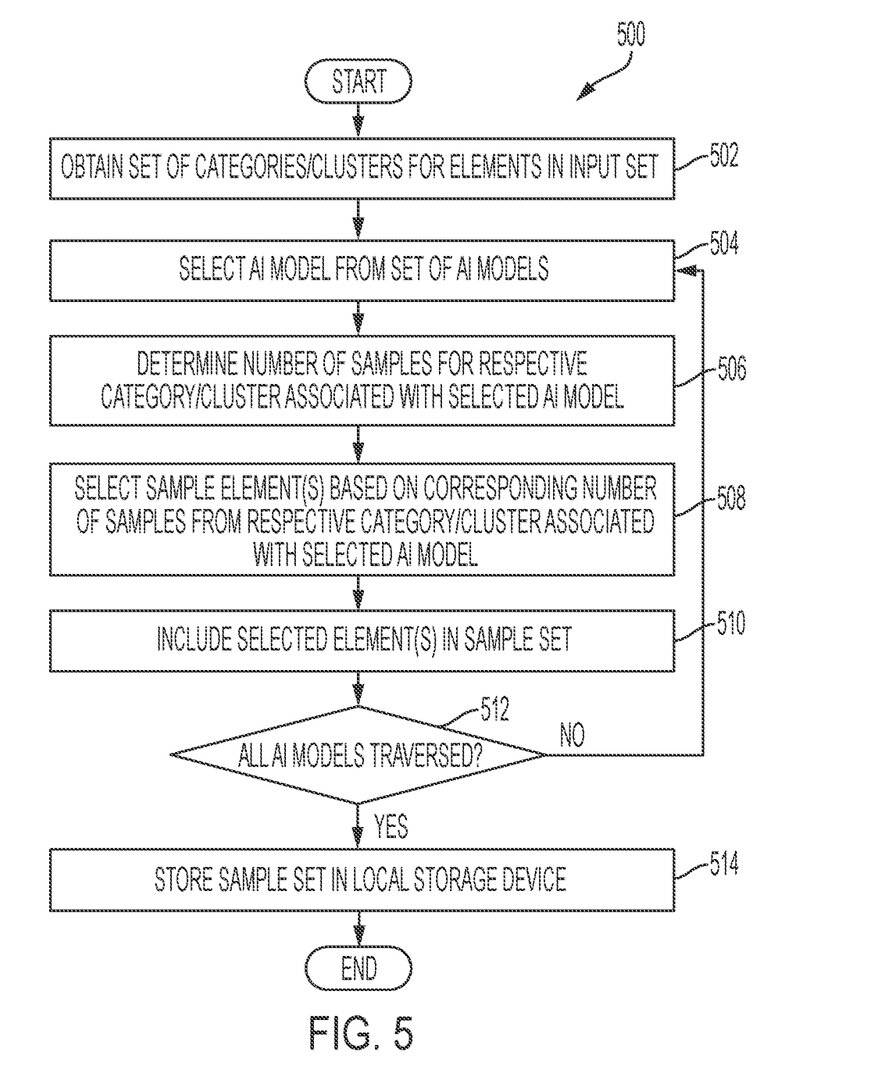
FIG. 5 presents a flowchart illustrating a method of a dataset management system efficiently selecting image samples based on a set of classifiers, in accordance with an embodiment of the present application.

FIG. 5 presents a flowchart 500 illustrating a method of a dataset management system efficiently selecting image samples based on a set of classifiers, in accordance with an embodiment of the present application. During operation, the system obtains a set of categories for the elements in the input set (operation 502) and selects an AI model from the set of AI models (operation 504). The system then determines a number of samples for a respective category/cluster associated with the selected AI model (operation 506). Subsequently, the system selects sample element(s) based on the corresponding number of samples from a respective category/cluster associated with the selected AI model (operation 508).

The system then includes the elected sample element(s) in the sample set (operation 510). The system can check whether all AI models have been traversed (operation 512). If all AI models have not been traversed, the system continues to select the next AI model from the set of AI models (operation 504). On the other hand, if all AI models have been applied, the system can store the sample set in a local storage device (operation 514).

Exemplary Computer System and Apparatus

Figure 6:
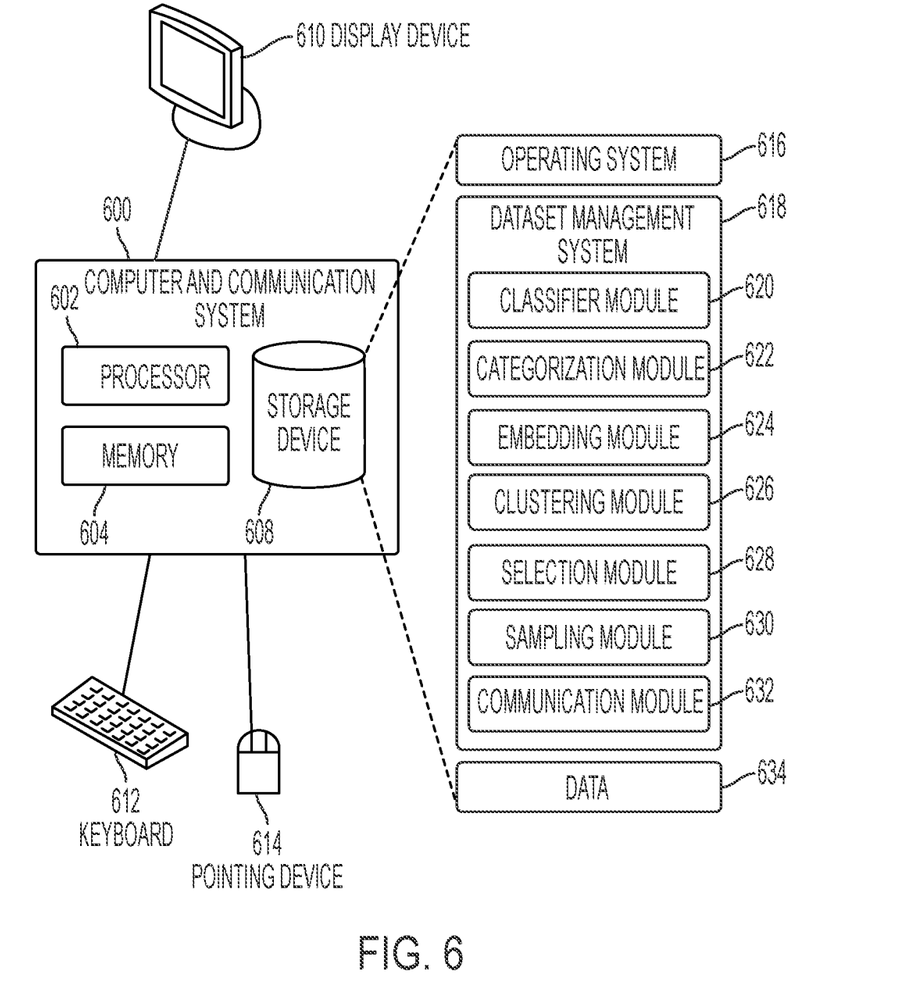
FIG. 6 illustrates an exemplary computer system that facilitates efficient management of a large input dataset for training an AI model, in accordance with an embodiment of the present application.

FIG. 6 illustrates an exemplary computer system that facilitates efficient management of a large input dataset for training an AI model, in accordance with an embodiment of the present application. Computer and communication system 600 includes a processor 602, a memory device 604, and a storage device 608. Memory device 604 can include a volatile memory device (e.g., a dual in-line memory module (DIMM)). Furthermore, computer and communication system 600 can be coupled to a display device 610, a keyboard 612, and a pointing device 614. Storage device 608 can store an operating system 616, a dataset management system 618, and data 634. Dataset management system 618 can facilitate the operations of system 110.

Dataset management system 618 can include instructions, which when executed by computer and communication system 600 can cause computer and communication system 600 to perform methods and/or processes described in this disclosure. Specifically, dataset management system 618 can include instructions for selecting a set of AI models (e.g., a set of pre-trained classifiers) that can be used for categorizing a dataset (classifier module 620). Dataset management system 618 can also include instructions for categorizing the elements of the dataset using a respective AI model (categorization module 622). Furthermore, dataset management system 618 can also include instructions for determining an embedding for a respective element based on a respective AI model (embedding module 624).

Moreover, dataset management system 618 can also include instructions for clustering the elements based on the embeddings of a respective AI model, thereby generating a set of clusters for each of the AI models (clustering module 626). Dataset management system 618 can include instructions for selecting one or more elements from a respective category and/or cluster (selection module 628). Dataset management system 618 can further include instructions for forming a sample set based on the selected elements (sampling module 630).

Dataset management system 618 may further include instructions for sending and receiving messages (communication module 632). Data 634 can include any data that can facilitate the operations of dataset management system 618. Data 634 can include, but are not limited to, input set 150 and sample set 160.

Figure 7:
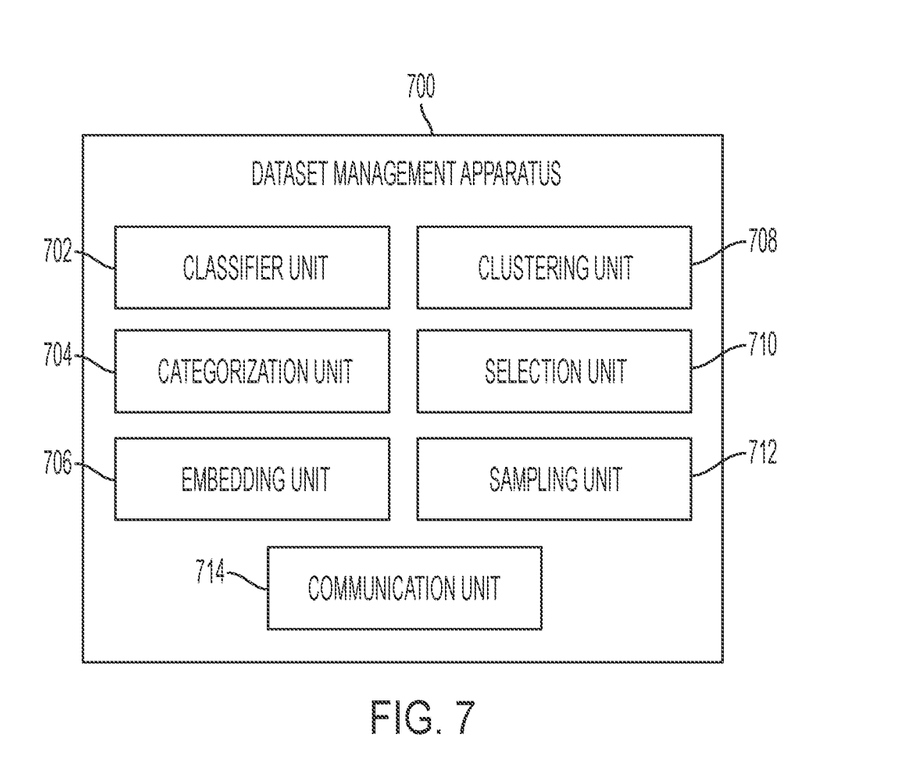
FIG. 7 illustrates an exemplary apparatus that facilitates efficient management of a large input dataset for training an AI model, in accordance with an embodiment of the present application.

FIG. 7 illustrates an exemplary apparatus that facilitates efficient management of a large input dataset for training an AI model, in accordance with an embodiment of the present application. Dataset management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-714, which perform functions or operations similar to modules 620-632 of computer and communication system 600 of FIG. 6, including: a classifier unit 702; a categorization unit 704; an embedding unit 706; a clustering unit 708; a selection unit 710; a sampling unit 712; and a communication unit 714.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating efficient dataset management, comprising:
  obtaining a first dataset comprising a plurality of data elements for training a first artificial intelligence (AI) model;

determining respective sets of categories of data elements by applying a plurality of AI models to the first dataset, wherein a respective set of categories corresponds to an AI model;

determining a set of joint categories from the sets of categories, wherein a respective joint category corresponds to at least two categories from at least two sets of categories, respectively;

selecting a set of sample data elements associated with a respective category of a respective set of categories by obtaining the set of sample data elements from the set of joint categories;

determining a second dataset based on the selected sample data elements; and training the first AI model using the second dataset.

2. The method of claim 1, wherein the plurality of AI models includes one or more pre-trained classifiers.

3. The method of claim 1, wherein applying an AI model of the plurality of AI models to the first dataset comprises categorizing the plurality of data elements into a corresponding set of categories supported by the AI model.

4. The method of claim 1, wherein applying an AI model of the plurality of AI models to the first dataset comprises:
obtaining embeddings for the plurality of data elements based on the AI model; and
grouping the plurality of data elements into a set of clusters based on the embeddings.

5. The method of claim 4, wherein grouping the plurality of data elements comprises applying a k-means clustering algorithm to the embeddings.

6. The method of claim 1, further comprising determining a number of sample data elements to be selected for a respective category of a set of categories associated with a respective AI model.

7. The method of claim 6, further comprising determining the number of sample data elements based on the set of joint categories obtained from the sets of categories.

8. The method of claim 6, further comprising determining the number of sample data elements for a category of a set of categories associated with an AI model without considering a category of another AI model.

9. The method of claim 6, wherein the number of sample data elements selected for the category corresponds to a proportion of data elements for the category in the first dataset.

10. The method of claim 1, wherein training the first AI model further comprises training the first AI model using the second dataset based on proportions of elements in the first dataset in a respective category of a set of categories associated with a respective AI model.

11. A non-transitory computer-readable storage medium storing instructions that when executed by a computer cause the computer to perform a method for facilitating efficient dataset management, the method comprising:
obtaining a first dataset comprising a plurality of data elements for training a first artificial intelligence (AI) model;

determining respective sets of categories of data elements by applying a plurality of AI models to the first dataset, wherein a respective set of categories corresponds to an AI model;

determining a set of joint categories from the sets of categories, wherein a respective joint category corresponds to at least two categories from at least two sets of categories, respectively;

selecting a set of sample data elements associated with a respective category of a respective set of categories by obtaining the set of sample data elements from the set of joint categories;

determining a second dataset based on the selected sample data elements; and training the first AI model using the second dataset.

12. The non-transitory computer-readable storage medium of claim 11, wherein the plurality of AI models includes one or more pre-trained classifiers.

13. The non-transitory computer-readable storage medium of claim 11, wherein applying an AI model of the plurality of AI models to the first dataset comprises categorizing the plurality of data elements into a corresponding set of categories supported by the AI model.

14. The non-transitory computer-readable storage medium of claim 11, wherein applying an AI model of the plurality of AI models to the first dataset comprises:
obtaining embeddings for the plurality of data elements based on the AI model; and
grouping the plurality of data elements into a set of clusters based on the embeddings.

15. The non-transitory computer-readable storage medium of claim 14, wherein grouping the plurality of data elements comprises applying a k-means clustering algorithm to the embeddings.

16. The non-transitory computer-readable storage medium of claim 11, wherein the method further comprises determining a number of sample data elements to be selected for a respective category of a set of categories associated with a respective AI model.

17. The non-transitory computer-readable storage medium of claim 16, wherein the method further comprises determining the number of sample data elements based on the set of joint categories obtained from the sets of categories.

18. The non-transitory computer-readable storage medium of claim 16, wherein the method further comprises determining the number of sample data elements for a category of a set of categories associated with an AI model without considering a category of another AI model.

19. The non-transitory computer-readable storage medium of claim 16, wherein the number of sample data elements selected for the category corresponds to a proportion of data elements for the category in the first dataset.

20. The non-transitory computer-readable storage medium of claim 11, wherein training the first AI model further comprises training the first AI model using the second dataset based on proportions of elements in the first dataset in a respective category of a set of categories associated with a respective AI model.

* * * * *